United States Patent Office 3,841,987
Patented Oct. 15, 1974

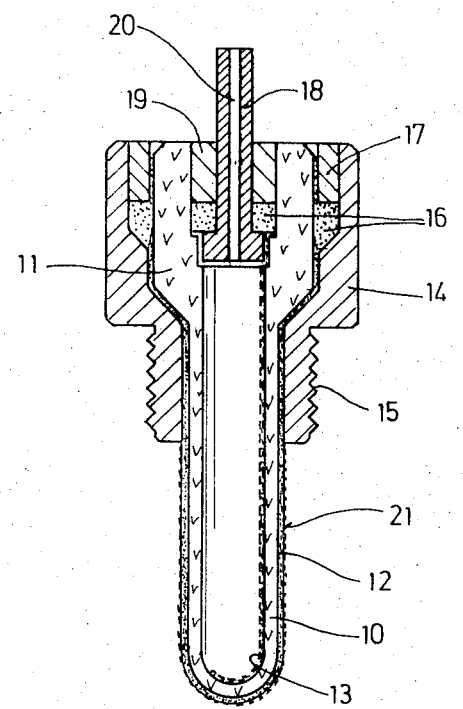

3,841,987
ELECTRO-CHEMICAL OXYGEN SENSOR, PARTICULARLY FOR USE IN THE EXHAUST SYSTEM OF INTERNAL COMBUSTION ENGINES
Karl-Hermann Friese and Heinz Geier, Leonberg, Rudolf Pollner, Kornwestheim, and Heino Schallert, Stuttgart, Germany, assignors to Robert Bosch GmbH, Gerlingen-Schillerhohe, Germany
Filed Dec. 18, 1972, Ser. No. 316,008
Claims priority, application Germany, Mar. 10, 1972, P 22 11 585.1
Int. Cl. F02b 1/100; G01n 27/46
U.S. Cl. 204—195 S
13 Claims

ABSTRACT OF THE DISCLOSURE

A tube of solid electrolyte material is closed at one end, and covered with an electron conductive layer on both sides. The open end is formed with a thickened collar, and inserted in a metal socket which is outwardly threaded, to be screwed into the exhaust system of an internal combusion engine, the space between the collar and the socket being filled with an electrically conductive sealing mass, such as a mixture of plastic silicate containing material, such as talcum, kaoline, and a metal powder, or a glass with electron conductive additives such as metals, oxides, hard solids, carbon, or mixtures thereof. The inner electrode is likewise connected to a connection pin by means of such a sealing mass and, for additional mechanical strength, metal rings can be included between the socket and the flange, and between the flange and the connection pin to protect and seal off the sealing mass.

CROSS REFERENCE TO RELATED APPLICATION

U.S. Pat. 3,483,851, Reichardt, Dec. 16, 1969, U.S. Serial 239,740, filed Mar. 30, 1972, Zechnall et al., now Pat. No. 3,745,768, U.S. Serial 259,157, filed June 2, 1972, Schmidt et al., U.S. Serial 265,547, filed June 23, 1972, Wahl et al., now Pat. No. 3,759,232, U.S. Serial 259,134, filed June 2, 1972, Topp et al., U.S. Serial 259,254, filed June 2, 1972, Schmidt et al., now Pat. No. 3,782,347, U.S. Serial 267,562, filed May 6, 1972, Eichler et al., U.S. Serial 282,848, filed Aug. 22, 1972, Eichler et al., U.S. Serial 283,177, filed Aug. 23, 1972, Eichler et al., U.S. Serial 271,009, filed July 12, 1972, Scholl, U.S. Serial 296,601, filed Oct. 11, 1972, Schneider et al. (with respect to an air flow sensing device), U.S. Serial 298,108, filed Oct. 16, 1972, Wahl et al., U.S. Serial 300,047, filed Oct. 24, 1972, Linder et al.

The present invention relates to an electro-chemical sensing device to determine oxygen content in the exhaust gases of internal combusition engines by utilizing an ion conductive solid electrolyte as an oxygen concentration cell, the solid electrolyte being essentially in the form of a tube which is closed at one end.

Internal combustion engines, and particularly mobile internal combustion engines for use in automotive vehicles generate carbon monoxide, unburned, or partly burned hydrocarbons, and nitrogen-oxygen compounds which contribute to air pollution. In order to decrease the proportion of polluting substances in the exhaust, the engines in motor vehicles must be so controlled, or so supplied with fuel and air that the exhaust will have a minimum of noxious components, that is, that carbon monoxide and hydrocarbons are essentially completely oxidized to their highest oxidation level—carbon dioxide—and water, if applicable, and that nitrogen-oxygen compounds are transformed into elementary nitrogen and oxygen.

The noxious components in the exhaust gases are transformed into harmless compounds of carbon dioxide, nitrogen and water by subjecting the exhaust gases to afterburning, and conducting them at a temperature of above approximately 600° C. over catalysts. The exhaust gas must have a composition which is so adjusted that a practically complete transformation of the exhaust gases into harmless compounds is possible. This requires that the ratio of air to fuel must be as close to the stoichiometric ratio, which is usually characterized by the air number having a value of $\lambda=1$. As far as the oxygen content of the exhaust gases is concerned, a relationship of $\lambda=<1$ characterizes a composition in which there is no excess oxygen present which can exceed the various possible reactions beyond equilibrium stage; an air number at which $\lambda=>1$ is indicative of excess oxygen in the mixture. The air number $\lambda=1$ is exactly representative of stoichiometric proportion and indicates that the exhaust gases change between reducing and oxidizing state.

From a consideration of the composition of the exhaust gases emitted from an internal combustion engine, it is desirable that the exhaust gases have an air number of approximately unity, or just slightly below, and it is thus necessary to provide a sensing element which is responsive to the exhaust gases, that is, which is located in the path of the exhaust gases, and in which the oxygen content is determined, the sensing element providing an electrical output value which permits adjustment of the air-fuel ratio being supplied to the engine.

Various types of sensing elements have been proposed; they operate on the principle of oxygen concentration cells, with ion conductive solid electrolytes. A known sensor of this type is fixed and secured into the wall of the exhaust manifold, or exhaust pipe of the engine. Such an ion sensor can be exchanged, in case of damage or aging, only with great difficulty. It is, however, desirable to provide exchangeability for the ion sensing elements since it is possible that these sensors become defective or have a life which is less than that of the exhaust system component itself to which they are secured.

It is an object of the present invention to provide an electro-chemical sensing element to determine oxygen content in exhaust gases of engines, and more particularly internal combustion engines for automotive use, and which is so constructed that it can be easily made, is sturdy and reliable in operation, and can still be exchanged for a different element without destruction or replacement of the entire exhaust system component to which it is secured, and which readily permits connection of electrical conductors thereto.

Subject matter of the present invention

Briefly, a solid electrolyte tube has an electron conductive, outer electrode layer which is capable of catalyzing the gas equilibrium, the inner space of the solid electrolyte tube including an inner electrode; the solid electrolyte tube, at its open end, is formed with a collar, and the electron conductive layer (or a conductor connected thereto, which, of course, would likewise be electron conductive) extends to this collar. The solid electrolyte body is then secured to a metal socket, typically made of steel, which has at the outside a connection arrangement, such as a screw thread, bayonet slot, or the like. The space between the solid electrolyte body, or rather the end collar thereof, and the metal socket is filled with a sealing mass which is electrically conductive and capable of resisting temperatures in the range of about 350° to 450° C., that is, the temperatures usually arising at this point in the exhaust systems of internal combustion engines, so that an electrical contact is established between the electron conductive layer and the socket.

The invention will be described by way of example with reference to the accompanying drawing wherein the single Figure illustrates a cross-sectional view through the sensing element, the transverse section thereof being preferably circular.

The sensing element essentially includes a solid electrolyte tube 10, which is closed at one end, hereinafter referred to as the inner end, and open at the other. The tube 10 is formed with a collar 11 adjacent its open end. The solid electrolyte tube may, for example, be made of stabilized cubic zirconium dioxide. The outer surface of the solid electrolyte tube 10 has a thin 10 $\mu$m. layer 12 of platinum applied thereto. This platinum layer covers not only the tube, but preferably extends to the outer surface of the collar 11. An inner electrode 13 is applied to the hollow space of the solid electrolyte tube 10, in the form of a conductive path, which is preferably also of platinum and is applied by brushing on a platinum suspension to the inner surface of the tube, and subsequently firing the platinum suspension. The electrode 13 also extends to the region of the collar 11. The solid electrolyte tube 10 is secured in a suitably shaped socket 14 made of steel, which at the outside has a thread 15 to screw the entire sensing element into and through the wall of an element of the exhaust system of an internal combustion engine. The socket 14 secures the electrolyte body in the region of its collar 11. An electrically conducting mass 16 is located between the collar 11 of the tube 10 and the socket 14, which mechanically interconnects the tube 10 and socket 14 and at the same time provides electrical contact between the outer platinum layer 12 and socket 14. The mass additionally ensures seal between the solid electrolyte body and the socket. It is important that the solid electrolyte body is gas-tight in the socket, since exhaust gases which would penetrate into the interior of the solid electrolyte tube 10 would change the oxygen partial pressure at the inner electrode 13 and thus result in erroneous readings from the sensing element.

A contact pin 18 is located in the upper portion of the space within the solid electrolyte tube 10, which is secured with a similar mass 16, both mechanically and electrically, to the interior of tube 10 and also to the inner electrode 13. The electrically conductive mass 16 is covered by steel rings 17, 19, which function as compression anvils to compress the electrically conductive mass. The contact pin 18 is formed with a central bore 20 to provide for free access of ambient air into the interior of tube 10 as a reference parameter.

A porous layer 21, approximately 200 $\mu$m. and made, for example, of lanthanium cobalt oxide, doped with strontium oxide covers the platinum layer 12 as a protection against mechanical and chemical damage.

The electrically conductive mass 16 preferably is made of 60% copper particles, 40% glass of a granular size of less than 60 $\mu$m. (by weight), which has the following composition (by weight): 60.9% $SiO_2$, 28.4% $B_2O_3$, 9.2% $Na_2O$ and 0.8% $Al_2O_3$.

The components are dry-mixed and, to obtain better dosing, are granulated by addition of organic binders, in accordance with well known processes.

The solid electrolyte body 10 is inserted in socket 14, and the contact pin 18 is inserted in the bore within the solid electrolyte body, made and fitted therefor. Thereafter, rings previously formed with a compression pressure of about 600 kp./cm.² are made of the previously described glass-copper granulate, and inserted into the gap between the solid electrolyte tube 10, or rather its collar, and the socket 14 and contact pin 18, respectively. Metal rings 17, 19 are then placed over the solid electrolyte body 10.

It is also possible to directly introduce the granulate into the ring gaps, and to pre-compress the granulate, to provide for better density. This method has the disadvantage, however, that it is difficult to introduce granulate into a gap which may be only 2 mm. wide, in uniform quantity, and only limited pressures can be used for pre-compression since, otherwise, the solid electrolyte tube may be damaged or destroyed.

The pre-formed rings made of the copper-glass granulate should be big enough to fill the ring gaps up to about 1 to 2 mm. below the upper edge of the socket, or the solid electrolyte tube (or its collar), respectively. The steel rings 17, 19 are of sufficient size so that they then will project over the edges by about 4 to 5 mm.

The sensing element, so pre-assembled, is then placed into a refractory holder and heated in a furnace to about 820° C. Immediately after removal from the furnace, and while still hot, the two metal rings 17 and 19 are pressed into the still soft melt with a pressure of about 50 kp./cm.². The softened granulate is thus made completely dense and pressed into all hollows, so that the two ring-formed gaps are completely and reliably filled with the electrically conductive melt 16. The pressure is maintained until the mass has been cooled below its transformation temperature of about 500° C. to form the fused mass 16.

The inner electrode preferably should reach all the way to the region of the collar, and the free space between the contact pin and the inner wall is filled with the same mass as that between the collar and the socket, that is, a material which can readily accept the temperatures arising in this region of from about 350° to 450° C. The metal rings 17, 19 may be additionally held in place not only by being embedded in the mass, and against the respective elements (pin-tube-socket) but may additionally be retained by retaining nuts, C-rings, peening-over of the edge of the socket 14, upsetting the pin 18 (without blocking the passage 20) or the like, to provide a mechanical contact between the rings 17, 19, respectively, and the adjacently located metal parts 14, 18, respectively.

The conductive sealing mass 16 can also be made of a mixture of a plastic silicate-containing raw material and an electron conductive powder.

The plastic silicate-containing raw material such as talcum or kaoline, or a mixture thereof, is thoroughly mixed with the electron conductive powder, preferably aluminum powder, in an amount of 20–25% by volume. This mixture is filled into the ring gap between the collar 11 and the socket 14 and the space between the tube 10 and the contact pin 18 and is then compressed by the application of a pressure of 300 to 600 kp./cm.² using suitable metal rings. Filling and compressing is repeated several times. After compressing, a gastight sealing is achieved as a result of the plastic deformability of the silicate-containing raw material. The compressed mass 16 is covered by steel rings 17, 19 which are additionally held in place as described above.

It is also possible to combine both methods described above, using one sealing mass, e.g. under ring 17, consisting of a mixture of a fused glassy material and an electron conductive material, and another sealing mass, e.g. under ring 19, consisting of a silicate containing material and an electron conductive material.

The sealing mass 16 is a two-component mixture, one component being refractory and the other component being an electron conductive material. The refractory component may be a mass of (1) glass or (2) a plastic silicate-containing raw material, such as talcum or kaoline or a mixture thereof. The electron conductive material may be a metal, electron conductive oxides, metal carbides such as tungsten carbide, or carbon, or mixtures thereof. Copper, iron, nickel, a mixture of iron and graphite, silicon, silicon carbide, carbon black, ferrites, $Fe_2O_3/Fe_3O_4$ and $Cu_2O \cdot Cr_2O_3$ are particularly suitable. These substances are present in the electrically conductive glass mass in a proportion of about 10 to 50% (by volume), preferably about 15 to 40% (by volume). The transformation point of the glass phase is approximately between 400 to 550° C. If the raw material is a plastic silicate-containing material, such as talcum and/or kaoline, and a conductive powder is used as electrically conductive material for the mass, then metal, preferably aluminum, is utilized in a quantity (by volume)

of about from 10 to 50%, and preferably from 20–25%.

Various changes and modifications may be made within the scope of the inventive concept.

What is claimed is:

1. Electro-chemical oxygen sensor, particularly for oxygen content determination in the hot exhaust gases of internal combustion engines, which is an oxygen concentration cell comprising
    a tube of ion conductive solid electrolyte material (10) closed at one end and having a thickened collar (11) at its other, open end;
    an electron conductive layer (12) located at the outer surface of the electrolyte material and extending thereover into the region of the collar (11);
    an inner electrode (13) in the hollow interior of the tube of electrolyte material;
    a metal socket (14) and retaining means (15) formed thereon;
    an electrically conductive heat resistant sealing mass which maintains its electrical conductivity and sealing characteristics at operating temperatures of between about 350° C. and 450° C. (16) connecting the collar (11) of the electrolyte tube (10) to the socket, said sealing mass filling the space between the tube and the socket to form a gas-tight seal and an electrical contact between the conductive layer (12) and the socket (14).

2. Sensor according to claim 1, wherein the inner electrode (13) extends to the region of the collar (11), an apertured contact pin (18) is located in the inner open end of the tube of solid electrolyte material, and an electrically conductive heat resistant sealing mass which maintains its electrical conductivity and sealing characteristics at operating temperatures of between about 350° C. and 450° C. (16) connecting the contact pin to the inner surface of the tube including the inner electrode (13), the sealing mass filling the space between the tube and the contact pin to form a gas-tight seal and an electrical contact between the conductive layer (13) and the contact pin (18).

3. Sensor according to claim 2, wherein the sealing mass (16) connecting the socket and the outer electrode and the sealing mass (16) connecting the contact pin and the inner electrode are similar.

4. Sensor according to claim 1, further comprising metals rings (17) (19) concentric with said tube and with the socket and located above said sealing mass.

5. Sensor according to claim 1, wherein the sealing mass (16) is an electrically conductive fused mass, or a mixture of a metal powder and at least one plastic silicate-containing substance selected from the group consisting of talcum and kaolin.

6. Sensor according to claim 5, wherein the electrically conductive sealing mass (16) comprises talcum and 10 to 50% by volume of a metal powder.

7. Sensor according to claim 6, wherein the metal powder is aluminum.

8. Sensor according to claim 6, wherein the metal powder is present in from 20 to 25% by volume.

9. Sensor according to claim 1, wherein the electrically conductive sealing mass (16) comprises
    an electrically conductive material including at least one of: metals, electron conductive oxides, metal carbides, and carbon;
    and a refractory material including at least one of: glass, and a plastic silicate-containing material.

10. Sensor according to claim 9, wherein the electrically conductive material includes at least one of: copper, iron, nickel, silicon, silicon carbide, carbon black, $Fe_2O_3/Fe_3O_4$ and $Cu_2O \cdot Cr_2O_3$.

11. Sensor according to claim 9, wherein the electrically conductive material is present in the proportion of 10 to 50% by volume.

12. Sensor according to claim 9, wherein the electrically conductive material is present in the proportion of 15 to 40% by volume.

13. Sensor according to claim 1, wherein the sealing mass is a plastic silicate-containing material and is at least one selected from the group consisting of talcum, and kaolin.

References Cited
UNITED STATES PATENTS

| | | | |
|---|---|---|---|
| 3,454,486 | 7/1969 | Davies | 204—195 S |
| 3,668,099 | 6/1972 | Rittiger et al. | 204—195 S |
| 3,332,867 | 7/1967 | Miller et al. | 204—197 |
| 3,598,711 | 8/1971 | Flais | 204—195 S |

TA-HSUNG TUNG, Primary Examiner

U.S. Cl. X.R.

60—285; 123—119 E